United States Patent
Panda et al.

(10) Patent No.: US 10,628,162 B2
(45) Date of Patent: Apr. 21, 2020

(54) ENABLING PARALLEL MEMORY ACCESSES BY PROVIDING EXPLICIT AFFINE INSTRUCTIONS IN VECTOR-PROCESSOR-BASED DEVICES

(71) Applicant: QUALCOMM Incorporated, San Diego, CA (US)

(72) Inventors: Amrit Panda, Redmond, WA (US); Eric Rotenberg, Raleigh, NC (US); Hadi Parandeh Afshar, San Diego, CA (US); Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 46 days.

(21) Appl. No.: 16/012,347

(22) Filed: Jun. 19, 2018

(65) Prior Publication Data
US 2019/0384606 A1 Dec. 19, 2019

(51) Int. Cl.
*G06F 9/345* (2018.01)
*G06F 9/38* (2018.01)
*G06F 8/41* (2018.01)

(52) U.S. Cl.
CPC .......... *G06F 9/3455* (2013.01); *G06F 8/4441* (2013.01); *G06F 8/456* (2013.01); *G06F 9/3879* (2013.01); *G06F 9/3891* (2013.01)

(58) Field of Classification Search
CPC .... G06F 9/3455; G06F 9/3879; G06F 9/3891; G06F 8/456; G06F 8/4441
See application file for complete search history.

(56) References Cited

U.S. PATENT DOCUMENTS

| | | | |
|---|---|---|---|
| 6,785,743 B1 | 8/2004 | Sun et al. | |
| 8,645,935 B2 | 2/2014 | Barua et al. | |
| 8,918,770 B2* | 12/2014 | Ravi | G06F 8/4441 717/140 |
| 9,038,045 B2* | 5/2015 | Gao | G06F 8/51 717/160 |
| 9,501,448 B2 | 11/2016 | Omtzigt | |
| 9,569,190 B1 | 2/2017 | Gschwind et al. | |
| 2010/0299657 A1* | 11/2010 | Barua | G06F 8/456 717/136 |
| 2017/0083313 A1 | 3/2017 | Sankaralingam et al. | |

(Continued)

*Primary Examiner* — Nimesh G Patel
(74) *Attorney, Agent, or Firm* — Withrow & Terranova, PLLC

(57) ABSTRACT

Enabling parallel memory accesses by providing explicit affine instructions in vector-processor-based devices is disclosed. In this regard, a vector-processor-based device implementing a block-based dataflow instruction set architecture (ISA) includes a decoder circuit configured to provide an affine instruction that specifies a base parameter indicating a base value B, a stride parameter indicating a stride interval value S, and a count parameter indicating a count value C. The decoder circuit of the vector-processor-based device decodes the affine instruction, and generates an output stream comprising one or more output values, wherein a count of the output values of the output stream equals the count value C. Using an index X where $0 \leq X < C$, each $X^{th}$ output value in the output stream is generated as a sum of the base value B and a product of the stride interval value S and the index X.

21 Claims, 7 Drawing Sheets

(56) References Cited

U.S. PATENT DOCUMENTS

| | | | |
|---|---|---|---|
| 2017/0269931 A1* | 9/2017 | Hwang | G06F 9/30036 |
| 2018/0157471 A1* | 6/2018 | Venkataramani | G06F 8/445 |
| 2019/0042221 A1* | 2/2019 | Krishnaiyer | G06F 8/45 |
| 2019/0278593 A1* | 9/2019 | Elango | G06F 9/3001 |

* cited by examiner

```
           CONTIGUOUS ACCESS OF ENTIRE VECTOR (300)

0:   [1,1]    movi #0       //   base=0 for affine
1:   b[1,r]   aff #(+1, 8)  //   stride = +1; count = 8;
                                 output = 0,1,2,...7
```

```
         NON-CONTIGUOUS ACCESS OF EVEN VECTOR ELEMENTS (302)

0:   [1,1]    movi #0       //   base = 0 for affine
1:   [2,r]    aff #(+2, 4)  //   stride = +2; count = 4;
                                 output = 0,2,4,6
```

```
           TRUNCATED VECTOR ACCESS, ACCESSING VECTOR TAIL (304)

0:   [1,1]    movi #3       //   base = 3 for affine
1:   b[1,r]   aff #(+1, 5)  //   stride = +1; count = 5;
                                 output = 3,4,5,6,7
```

```
           TRUNCATED VECTOR ACCESS, ACCESSING VECTOR HEAD (306)

0:   [1,1]    movi #0       //   base = 0 for affine
1:   [2,r]    aff #(+1, 5)  //   stride = +1; count = 5;
                                 output = 0,1,2,3,4
```

*FIG. 3*

```
EXPLICIT OUTER LOOP, USING AFFINE INSTRUCTION FOR INNER LOOP (400)
.B0
0:   [1,1][2,1]    read r2          //  read register r2
                                        to get initial
                                        value for i
1:   r3            muli #N          //  N*i. Block B0
                                        updates the   base
                                        for block B1's
                                        affine accesses
2:   r2   [3,1]    addi #1          //  i++
3:                 tbgt #K #B3      //  Count = K; if i>K
                                        proceed to B3

.B1
0:   [1,1]         read r3          //  N*i. Register r3
                                        provides base for
                                        the affine
                                        instruction
1:   b[1,1]        aff # (+1,M)     //  for (j=0; j<M; j++)
                                        aff=N*I + j;
2:   [4,1]         lb b1 #(&a)      //  a[N*I + j]
3:   [4,r]         lb b1 #(&b)      //  b[N*I + j]
4:   [5,r]         add
5:                 sb b1 #(&c)      //  c[N*I + j]

.B2
0:                 b #B0            //  Unconditional
                                        branch to B0
```

*FIG. 4A*

| CASCADE AFFINE INSTRUCTIONS TO IMPLEMENT NESTED LOOPS WITHIN A SINGLE DATAFLOW INSTRUCTION BLOCK (402) |
|---|

```
.B0
0:      [1,1]       movi #0              //  Base=0 for
                                              outer affine
1:      [2,1]       aff #(+N,K,1)        //  Outer loop
2:      b[1,1]      aff #(+1,M,0)        //  Inner loop
3:      [5,1]       lb b1 #(&a)          //  a[N*i + j]
4:      [5,r]       lb b1 #(&b)          //  b[N*i + j]
5:      [6,r]       add
6:                  sb b1 #(&c)          //  c[N*I +j]
```

FIG. 4B

ENABLING PARALLEL MEMORY ACCESSES BY PROVIDING EXPLICIT AFFINE INSTRUCTIONS IN VECTOR-PROCESSOR-BASED DEVICES

BACKGROUND

I. Field of the Disclosure

The technology of the disclosure relates generally to vector-processor-based devices, and, in particular, to facilitating parallel memory accesses by vector-processor-based devices.

II. Background

Vector-processor-based devices are computing devices that employ vector processors capable of operating on one-dimensional arrays of data ("vectors") using a single program instruction. Conventional vector processors include multiple processing elements (PEs) that are organized into vector lanes, each of which may perform computations in parallel with each other. Vector-processor-based devices are particularly useful for processing vectorizable loops that involve a high degree of data level parallelism. When processing such a loop, each PE of a vector processor may perform the same task (e.g., executing different loop iterations of the loop) in parallel. In particular, functional units constituting each PE execute in parallel on different operands read from a vector, with corresponding functional units of different PEs operating on different elements of the same vector.

Many vectorizable loops that exhibit high degrees of data level parallelism tend to employ regular patterns for memory accesses. However, operations performed by the vector-processor-based device to process such vectorizable loops may consume significant computational bandwidth. In particular, operations for incrementing and comparing an induction variable of a vectorizable loop, and for evaluating and performing conditional jumps within each loop iteration, may incur excessive processing overhead, thereby negatively impacting overall system performance. Accordingly, it is desirable to provide a mechanism for reducing or eliminating processing overhead associated with induction variable handling in vectorizable loops.

SUMMARY OF THE DISCLOSURE

Aspects disclosed in the detailed description include enabling parallel memory accesses by providing explicit affine instructions in vector-processor-based devices. In this regard, a vector-processor-based device is provided that implements a block-based dataflow instruction set architecture (ISA), and that includes a vector processor providing a decoder circuit. The decoder circuit is configured to provide an affine instruction that allows induction variable values of vectorizable loops to be generated using affine functions. In particular, the affine instruction specifies a base parameter, a stride parameter, and a count parameter. The base parameter of the affine instruction indicates a base value B, which may represent a base for accessing a vector in some aspects. The stride parameter indicates a stride interval value S, which may represent a stride between vector elements of the vector according to some aspects. The count parameter indicates a count value C that may represent, as a non-limiting example, a vector length of the vector and/or a trip count of a loop for processing the vector. When processing a vectorizable loop, the decoder circuit of the vector-processor-based device decodes the affine instruction, and then generates an output stream comprising one or more output values (e.g., that may be directed to one or more consumer instructions to be executed in parallel, according to some aspects), wherein a count of the one or more output values of the output stream equals the count value C. Using an index X where $0 \leq X < C$, each $X^{th}$ output value in the output stream is generated as a sum of the base value B and a product of the stride interval value S and the index X. Some aspects may also provide that the affine instruction further specifies an optional loop level parameter indicating a nested level of the affine instruction relative to one or more other affine instructions. In this manner, the affine instruction provides ISA support for multi-dimensional affine access patterns that enable parallel memory accesses (e.g., from memory and/or from a vector register file, as non-limiting examples) when processing vectorizable loops, while eliminating the computational overhead associated with conventional induction variable handling.

In another aspect, a vector-processor-based device implementing a block-based dataflow ISA for enabling parallel memory accesses is provided. The vector-processor-based device is configured to provide an affine instruction comprising a base parameter indicating a base value B, a stride parameter indicating a stride interval value S, and a count parameter indicating a count value C. The vector-processor-based device comprises a decoder circuit that is configured to decode the affine instruction. The decoder circuit is further configured to generate an output stream comprising one or more output values, wherein a count of the one or more output values equals the count value C, and each output value of the one or more output values corresponding to an index X, where $0 \leq X < C$, equals a sum of the base value B and a product of the stride interval value S and the index X.

In another aspect, a vector-processor-based device implementing a block-based dataflow ISA for enabling parallel memory accesses is provided. The vector-processor-based device comprises a means for decoding an affine instruction comprising a base parameter indicating a base value B, a stride parameter indicating a stride interval value S, and a count parameter indicating a count value C. The vector-processor-based device further comprises a means for generating an output stream comprising one or more output values, wherein a count of the one or more output values equals the count value C, and each output value of the one or more output values corresponding to an index X, where $0 \leq X < C$, equals a sum of the base value B and a product of the stride interval value S and the index X.

In another aspect, a method for enabling parallel memory accesses by a vector-processor-based device implementing a block-based dataflow instruction set is provided. The method comprises decoding, by a decoder circuit of the vector-processor-based device, an affine instruction comprising a base parameter indicating a base value B, a stride parameter indicating a stride interval value S, and a count parameter indicating a count value C. The method further comprises generating an output stream comprising one or more output values, wherein a count of the one or more output values equals the count value C, and each output value of the one or more output values corresponding to an index X, where $0 \leq X < C$, equals a sum of the base value B and a product of the stride interval value S and the index X.

In another aspect, a non-transitory computer-readable medium is provided, having stored thereon computer-executable instructions for causing a vector processor of a vector-processor-based device to decode an affine instruction comprising a base parameter indicating a base value B, a stride parameter indicating a stride interval value S, and a count parameter indicating a count value C. The computer-executable instructions further cause the vector processor to generate an output stream comprising one or more output values, wherein a count of the one or more output values equals the count value C, and each output value of the one or more output values corresponding to an index X, where $0 \leq X < C$, equals a sum of the base value B and a product of the stride interval value S and the index X.

BRIEF DESCRIPTION OF THE FIGURES

FIG. 3 is a diagram illustrating exemplary use cases for accessing vector elements using the affine instruction provided by the vector-processor-based device of FIG. 1;

FIGS. 4A and 4B are diagrams illustrating alternate approaches for implementing conventional nested loops to perform partial addition of two-dimensional (2D) vectors using the affine instruction provided by the vector-processor-based device of FIG. 1;

DETAILED DESCRIPTION

Figure 1:
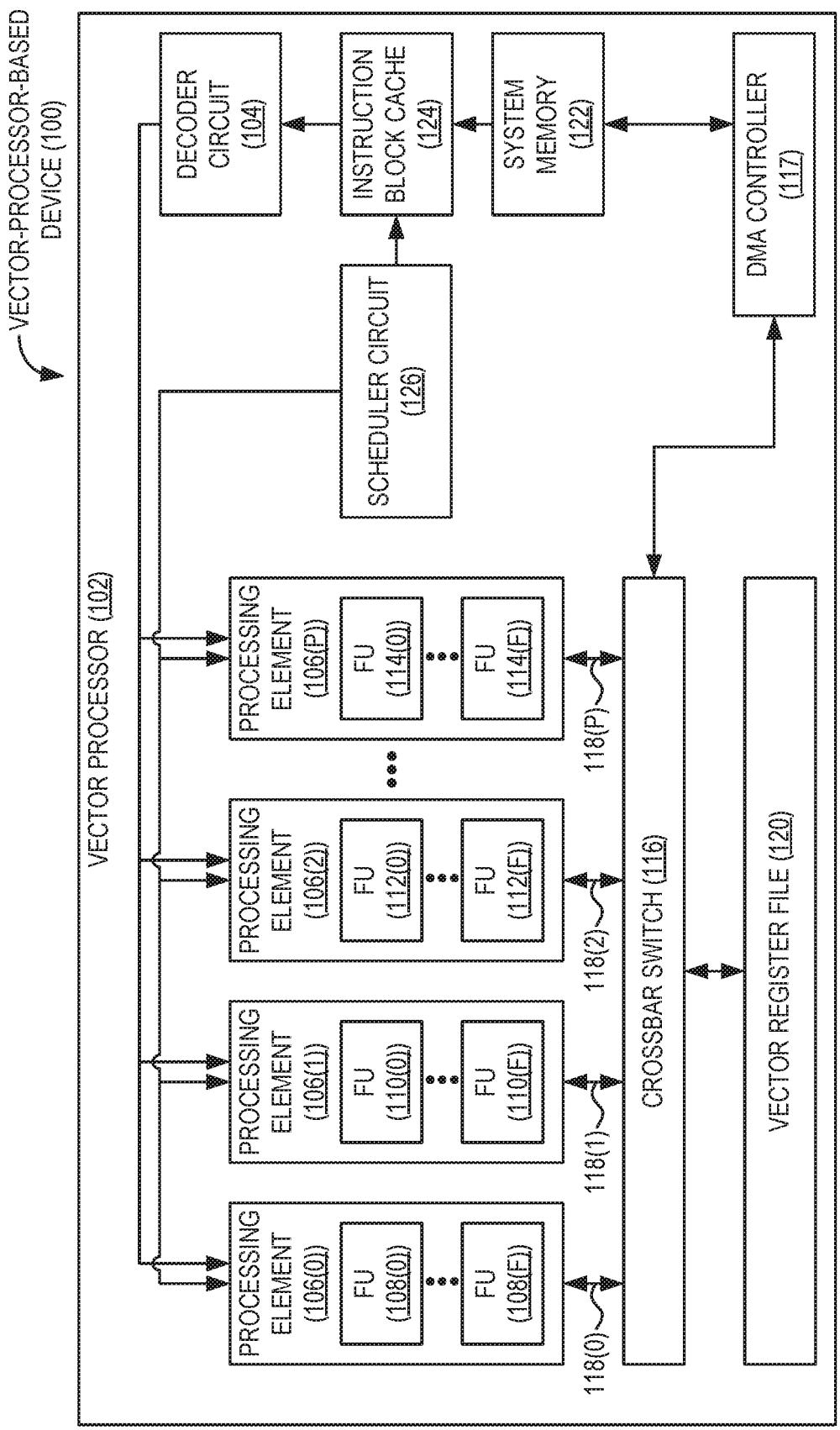
FIG. 1 is a block diagram illustrating a vector-processor-based device configured to enable parallel memory accesses using an affine instruction.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include enabling parallel memory accesses by providing explicit affine instructions in vector-processor-based devices. In this regard, FIG. 1 illustrates a vector-processor-based device 100 that implements a block-based dataflow instruction set architecture (ISA), and that provides a vector processor 102 comprising a decoder circuit 104. The vector processor 102 includes a plurality of processing elements (PEs) 106(0)-106(P), each of which may comprise a processor having one or more processor cores, or an individual processor core comprising a logical execution unit and associated caches and functional units, as non-limiting examples. In the example of FIG. 1, each of the PEs 106(0)-106(P) comprises a plurality of functional units ("FU") 108(0)-108(F), 110(0)-110(F), 112(0)-112(F), 114(0)-114(F). In some aspects, the PEs 106(0)-106(P) may be reconfigurable, such that each of the PEs 106(0)-106(P) may represent a fused PE comprising two or more constituent PEs configured to operate as a singular unit. It is to be understood that the vector-processor-based device 100 may include more or fewer vector processors than the vector processor 102 illustrated in FIG. 1, and/or may provide more or fewer PEs (each having more or fewer functional units) than the PEs 106(0)-106(P) illustrated in FIG. 1.

In the example of FIG. 1, the PEs 106(0)-106(P) are each communicatively coupled bidirectionally to a crossbar switch 116 via channels 118(0)-118(P), through which data (e.g., results of executing a loop iteration of a loop) may be read from and written to a vector register file 120. The crossbar switch 116 in the example of FIG. 1 is communicatively coupled to a direct memory access (DMA) controller 117, which is configured to perform memory access operations to read data from and write data to a system memory 122. The DMA controller 117 of FIG. 1 is also configured to control the crossbar switch 116 to exchange data between the vector register file 120, the system memory 122, and the PEs 106(0)-106(P), and store and retrieve vectors and vector elements in the vector register file 120. The system memory 122 according to some aspects may comprise a double-data-rate (DDR) memory, as a non-limiting example. In exemplary operation, dataflow instruction blocks (not shown) are fetched from the system memory 122, and may be cached in an instruction block cache 124 to reduce the memory access latency associated with fetching frequently accessed instruction blocks. The instruction blocks are decoded by the decoder circuit 104, and decoded instructions are assigned to a PE of the PEs 106(0)-106(P) by a scheduler circuit 126 for execution. To facilitate execution, the PEs 106(0)-106(P) may receive live-in data values from the vector register file 120 as input, and, following execution of instructions, may write live-out data values as output to the vector register file 120.

It is to be understood that the vector-processor-based device 100 of FIG. 1 may include more or fewer elements than illustrated in FIG. 1. The vector-processor-based device 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

One application for which the vector-processor-based device 100 may be well-suited is processing loops, which involves mapping each iteration of the loop to a different PE of the plurality of PEs 106(0)-106(P), and then executing multiple loop iterations in parallel. However, as noted above, operations performed by the vector-processor-based device 100 to process such vectorizable loops may consume significant computational bandwidth. In particular, operations on an induction variable of the vectorizable loop, including incrementing and comparing the induction variable, as well as operations for evaluating and performing conditional jumps within each vectorizable loop iteration, may incur excessive processing overhead, thereby negatively impacting overall system performance. Accordingly, it is desirable to provide a mechanism for reducing or eliminating the processing overhead associated with induction variable handling in vectorizable loops.

In this regard, the vector-processor-based device 100 of FIG. 1 includes the decoder circuit 104, which is configured to provide an affine instruction for enabling parallel memory accesses. The use of the affine instruction is premised on the recognition that many memory access operations that index into data structures may be expressed as affine functions in induction variables. For example, consider the following program code for performing a matrix multiplication operation, where a, b, and c represent matrices, N represents an index value, and i, j, and k represent loop induction values:

$$c[N*i+j] = a[N*i+k] * b[N*k+j]$$

In this example, the matrices a, b, and c may be treated as two-dimensional (2D) vectors accessed using memory access operations that can be expressed as three (3) affine functions $F_1$, $F_2$, and $F_3$ in the loop induction variables i, j, and k:

$F_1(i,j,k)=N*i+1*j+0*k$ for accessing elements of matrix c;

$F_2(i,j,k)=N*i+0*j+1*k$ for accessing elements of matrix a; and $F_3(i,j,k)=0*i+1*j+N*k$ for accessing elements of matrix b.

Thus, the use of the affine instruction can eliminate the computational overhead associated with handling loop induction variables, while expressing parallelism in the memory access operations. While the affine instruction provided by the decoder circuit 104 can legally target any instruction, the affine instruction most commonly may target vector read and write instructions, vector load and store instructions, and other instances of the affine instruction.

Figure 2:
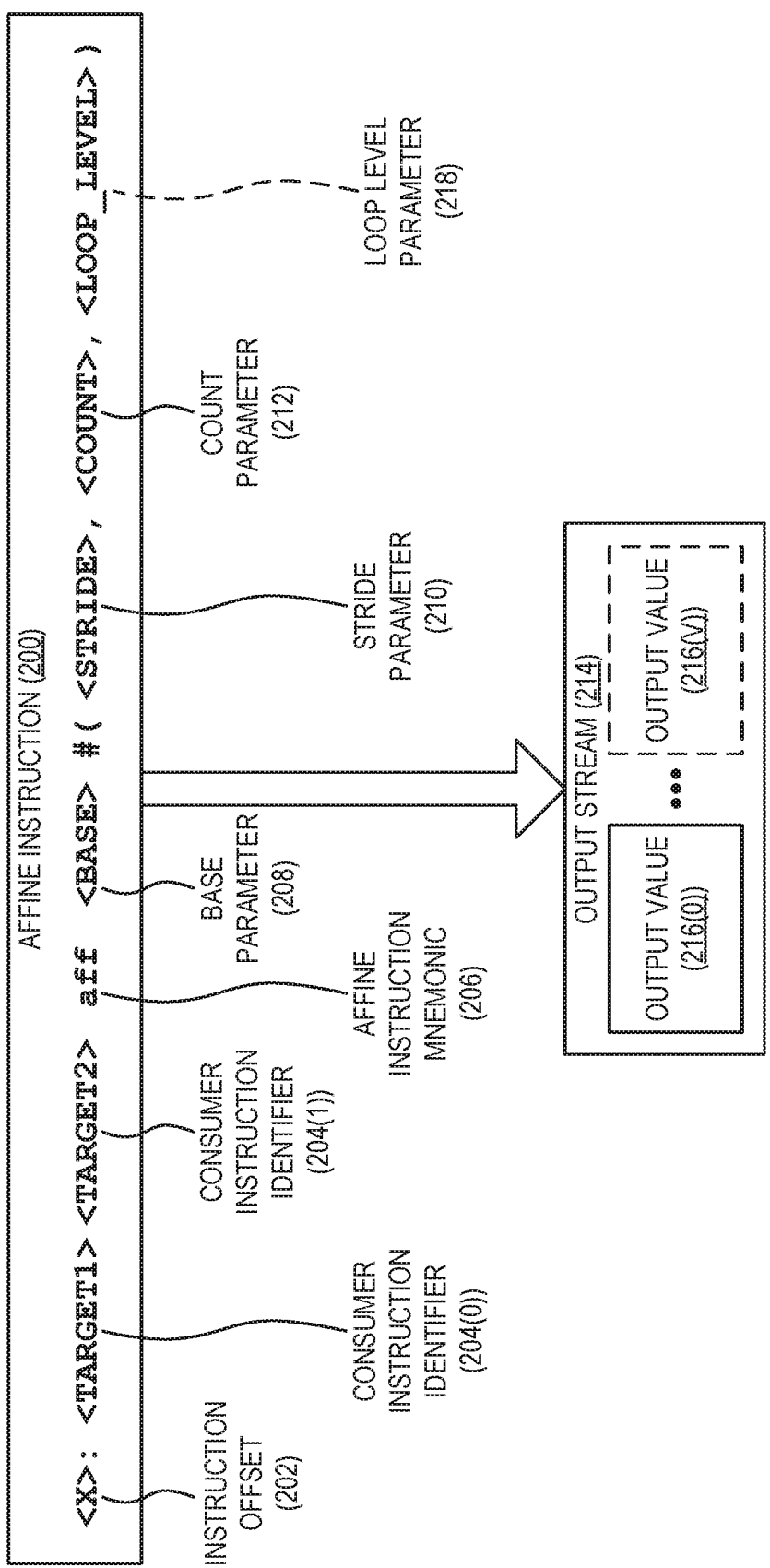
FIG. 2 is a block diagram illustrating an exemplary syntax of the affine instruction provided by the vector-processor-based device of FIG. 1.

FIG. 2 illustrates an exemplary syntax of an affine instruction 200 provided by the vector-processor-based device 100 of FIG. 1. It is to be understood that the syntax of the affine instruction 200 shown in FIG. 2 is for illustrative purposes only, and that other aspects providing the affine instruction 200 may structure the affine instruction 200 differently than illustrated in FIG. 2. It is to be further understood that, while the example shown in FIG. 2 employs a forward dataflow notation, other aspects may implement the affine instruction 200 using a backward dataflow notation. The examples discussed in FIG. 2 also employ a broadcast mechanism for transmitting output values from each producer instruction to one or more consumer instructions, as is known in the art. Some aspects may employ a different mechanism for communication between producer instructions and consumer instructions (such as, for example, communication via general purpose registers or via a specialized affine register namespace). Finally, it is to be understood that some of the operands illustrated in FIG. 2 may be considered optional and/or may be implicitly referenced rather than being explicitly stated.

In the example of FIG. 2, the affine instruction 200 includes an instruction offset 202, which is an integer indicating a position of the affine instruction 200 relative to the beginning of a dataflow instruction block (not shown) that contains the affine instruction 200. Accordingly, the instruction offset 202 may be used as a unique identifier for the affine instruction 200 within the dataflow instruction block in which it resides. The affine instruction 200 in this example may also specify up to two (2) consumer instruction identifiers 204(0)-204(1) (e.g., "TARGET1" and "TARGET2") that identify consumer instructions for which the affine instruction 200 is a producer instruction. The consumer instruction identifiers 204(0)-204(1) each may indicate either an instruction offset of a consumer instruction of the affine instruction 200, or a broadcast channel to which an output stream of the affine instruction 200 is to be directed for transmission to any consumer instructions that are snooping the broadcast channel. Each of the consumer instruction identifiers 204(0)-204(1) may also specify whether the output from the affine instruction 200 is to be received by a consumer instruction as a left input operand or a right input operand. The examples discussed below with respect to FIGS. 3 and 4A-4B discuss the use of the consumer instruction identifiers 204(0)-204(1) in greater detail. The affine instruction 200 is represented in FIG. 2 by an affine instruction mnemonic 206, which in this example is "aff."

To generate an output stream of output values, the affine instruction 200 specifies a base parameter 208, a stride parameter 210, and a count parameter 212. The base parameter 208 indicates a base value B for vector accesses to a vector, while the stride parameter 210 indicates a stride interval value S representing a stride between vector elements of the vector. The count parameter 212 indicates a count value C that may represent, as a non-limiting example, a vector length of the vector and/or a trip count of a loop for processing the vector. When decoded by the decoder circuit 104, the affine instruction 200 generates an output stream 214 comprising one or more output values 216(0)-216(V), wherein a count of the output values 216(0)-216(V) of the output stream 214 equals the count value C (i.e., V=C−1). Using an index X where 0≤X<C, each $X^{th}$ output value 216(0)-216(V) in the output stream 214 is generated as a sum of the base value B and a product of the stride interval value S and the index X. Thus, the output stream 214 generated by the affine instruction 200 is equivalent to the output generated by the following code for populating an array affine_output:

For (X=0; X<C; X++) affine_output[X]=B+X*S;

In some aspects, the output stream 214 may be received by the plurality of PEs 106(0)-106(P) of FIG. 1. The PEs 106(0)-106(P) may then execute one or more consumer instructions of the affine instruction 200 in parallel using corresponding output values of the one or more output values 216(0)-216(V) of the output stream 214 as input operands.

The affine instruction 200 according to some aspects may also specify an optional loop level parameter 218. The loop level parameter 218 is used to indicate a nested level of the affine instruction 200 relative to other affine instructions 200. In some aspects in which nested affine instructions 200 are employed, the loop level parameter 218 of an innermost nested affine instruction 200 is set to zero (0), and the loop level parameter 218 of each next-innermost affine instruction 200 is incremented by one (1). While multiple instances of the affine instruction 200 may specify the same value for their respective loop level parameters 218, in aspects in which two (2) affine instructions 200 are cascaded (i.e., a producer affine instruction 200 targets a consumer affine instruction 200), the value of the loop level parameter 218 of the producer affine instruction 200 may be required to be one (1) greater than the value of the loop level parameter 218 for the consumer affine instruction 200.

To illustrate exemplary use cases for the affine instruction 200 of FIG. 2 and the output stream 214 generated by the affine instruction 200 for each use case, FIG. 3 is provided. As seen in FIG. 3, four (4) different examples are provided: example 300, which illustrates using the affine instruction 200 for contiguous access of an entire vector; example 302, showing how the affine instruction 200 may be used for non-contiguous access of even vector elements; example 304, illustrating truncated vector access to a tail of the vector; and example 306, which shows truncated vector access to a head of the vector. Each example is discussed in greater detail below. Note that, in each example, the leftmost column represents an instruction offset for each instruction, while the next two columns represent a consumer instruction identifier followed by an instruction and its parameters.

In example 300, an affine instruction ("aff") is being used to generate indices for accessing each of eight (8) elements of a vector. Accordingly, a move immediate instruction ("movi") at instruction offset 0 is used to specify a base parameter value of zero (0) for an affine instruction by moving an immediate value of zero ("#0") as the left parameter to the affine instruction at instruction offset 1 (as indicated by the consumer instruction identifier "[1, 1]"). The affine instruction receives the base parameter implicitly, and further specifies two (2) immediate values: a value of "+1" for the stride parameter, and a value of "8" for the count parameter. As a result, the output stream generated by the affine instruction comprises the output values 0, 1, 2, . . . 7. The affine instruction provides the output stream to consumer instructions as a right operand via a broadcast channel 1 (as indicated by the consumer instruction identifier "b[1, r]").

Example 302 illustrates an affine instruction being used to generate indices for accessing only the even vector elements of the vector. As in example 302, a move immediate instruction is used to specify a base parameter value of zero (0), which an affine instruction at instruction offset 1 receives implicitly as a left parameter. The affine instruction also specifies a stride parameter value of "+2" and a count parameter value of "4." Accordingly, the output stream comprises the output values of 0, 2, 4, and 6. The affine instruction routes the output stream as a right parameter of a consumer instruction at instruction offset 2 (not shown), as indicated by the consumer instruction identifier "[2, r]."

The instructions shown in example 304 generate indices for accessing only the trailing elements in a tail of the vector. Thus, a move immediate instruction at instruction offset 0 specifies a base parameter value of three (3) for an affine instruction at instruction offset 1. The affine instruction specifies a value of "+1" for the stride parameter and a value of "5" for the count parameter, thus generating an output stream comprising the output values 3, 4, 5, 6, and 7. The affine instruction provides the output stream to consumer instructions as a right operand via the broadcast channel 1, as indicated by the consumer instruction identifier "b[1, r]."

Finally, in example 306, instructions are illustrated for generating indices for accessing only leading elements in a head of the vector. Accordingly, a move immediate instruction at instruction offset 0 specifies a base parameter value of zero (0) for an affine instruction at instruction offset 1. The affine instruction further specifies a stride parameter value of "+1" and a count parameter value of "5," resulting in an output stream comprising the output values 0, 1, 2, 3, and 4. The affine instruction routes the output stream as a right parameter of a consumer instruction at instruction offset 2 (not shown), as indicated by the consumer instruction identifier "[2, r]."

FIGS. 4A and 4B are diagrams illustrating alternate approaches for implementing conventional nested loops to perform partial addition of 2D vectors using instances of the affine instruction 200 of FIG. 2. The example code shown below performs a partial addition of 2D vectors, where a, b, and c represent vectors of size N by N, with a "tile" of size K×M being accessed:

For (i=0; i<K; i++)
  For (j=0; j<M; j++)
    c[N*i+j]=a[N*i+j]+b[N*i+j]

This partial addition may be performed using instances of the affine instruction 200 of FIG. 2 to generate the following plurality of output streams:

$0, 1, 2, \ldots M-1$ $N+0, N+1, N+2, \ldots N+M-1$ $2^*N+0, 2^*N+1, 2^*N+2, \ldots 2^*N+M-1$ $\ldots$ $(K-1)^*N+0, (K-1)^*N+1, (K-1)^*N+2, \ldots (K-1)^*N+M.$ FIG. 4A illustrates an example 400 that uses an explicit outer loop and employs an affine instruction ("aff"), such as the affine instruction 200 of FIG. 2, for the inner loop only. In the example of FIG. 4A, three (3) dataflow instruction blocks B0, B1, and B2 are shown. The dataflow instruction blocks B0 and B2 implement an outer loop that updates an outer induction variable, while the dataflow instruction block B1 implements an inner induction variable using an affine instruction. As with the examples shown in FIG. 3, the leftmost column within each dataflow instruction block B0, B1, B2 represents the instruction offset for each instruction, while the next two columns represent one or more consumer instruction identifiers followed by an instruction and its parameters.

In dataflow instruction block B0, a "read" instruction at instruction offset 0 reads an initial value for an induction variable "I" from a register "r2." The value that is read is then provided as a left operand to the instruction at instruction offset 1 (as indicated by the consumer instruction identifier "[1, 1]") as well as a left operand to the instruction at instruction offset 2 (as indicated by the consumer instruction identifier "[2, 1].)" The next instruction at instruction offset 1 is a multiply immediate ("muli") instruction that receives the value from the "read" instruction as an implicit left operand, multiplies the received value by the immediate value N ("#N"), and sends the result to a register "r3." The instruction at instruction offset 2, which also received the value from the "read" instruction as an implicit left operand, is an add immediate ("addi") instruction that increments the value from the "read" instruction and stores it back into the register "r2." The add immediate instruction also sends the incremented value as a left operand to the instruction at instruction offset 3 (as indicated by the consumer instruction identifier "[3, 1]"), which is a test-and-branch instruction ("tbgt"). If the value received by the test-and-branch instruction is greater than the immediate value K ("#K"), program control is transferred to a dataflow instruction block B3 (not shown).

Referring now to dataflow instruction block B1, the instruction at instruction offset 0 is a "read" instruction that retrieves the value stored in the register "r3," and provides it as a left operand to the instruction at instruction offset 1 (as indicated by the consumer instruction identifier "[1, 1]"). The instruction at instruction offset 1 is an affine instruction ("aff") that uses the value provided from register "r3" as a base, and further specifies a stride parameter value of "+1" and a count parameter value of "M". The output stream generated by the affine instruction is then sent as a left operand to a broadcast channel 1 (as indicated by the consumer instruction identifier "b[1, 1]").

The next two instructions are load byte instructions ("lb") instructions that receive the output stream from the affine instruction via the broadcast channel 1, as indicated by left operands "b1." The load byte instruction at instruction offset 2 retrieves a value stored at a location indicated by the base address of array a ("#(&a)") plus the offset indicated by the output values retrieved from the broadcast channel 1. Similarly, the load byte instruction at instruction offset 3 retrieves a value stored at a location indicated by the base address of array b ("#(&b)") plus the offset indicated by the output values retrieved from the broadcast channel 1. The output values retrieved from the broadcast channel 1 thus in effect serve as indices into the arrays a and b. The load byte instruction at instruction offset 2 and the load byte instruction at instruction offset 3 then provide the retrieved values to the instruction at instruction offset 4 as the left operand and the right operand, respectively (as indicated by the consumer instruction identifiers "[4, 1]" and "[4, r]").

The instruction at instruction offset 4 is an add instruction ("add"), which receives the retrieved values from the load byte instructions at instruction offsets 2 and 3 as implicit left and right operands. The add instruction sums the retrieved values, and provides them to the instruction at instruction offset 5 as a right operand (as indicated by the consumer instruction identifier "[5, r]"). The instruction at instruction offset 5 is a store byte instruction ("sb") that receives the output stream from the affine instruction via the broadcast channel 1 (as indicated by the left operand "b1"), and also receives a summed value from the add instruction as an implicit right operand. The store byte instruction then stores the received summed value at a location indicated by the base address of array c ("#(&c)") plus the offset indicated by the output value retrieved from the broadcast channel 1. The lone instruction in the dataflow instruction block B2 is an unconditional branch instruction ("b") that causes program flow to return to the dataflow instruction block B0.

FIG. 4B illustrates an alternate example 402 for achieving the same partial addition of 2D vectors as in FIG. 4A, but using cascaded affine instructions to implement nested loops within a single dataflow instruction block B0. As seen in FIG. 4B, a move immediate instruction ("movi") sends an immediate value of zero ("#0") to the instruction at instruction offset 1 as a left operand (as indicated by the target consumer instruction indicator "[1, 1]"). The instruction at instruction offset 1 is an affine instruction ("aff") that uses the value provided from the move immediate instruction as a base parameter value, and further specifies a stride parameter value of "+N," a count parameter value of "K," and a loop level parameter of "1." The output stream generated by the affine instruction is then sent as a left operand to the instruction at instruction offset 2 (as indicated by the consumer instruction identifier "[2, 1]").

In this example, the instruction at instruction offset 2 is also an affine instruction ("aff") that uses each output value provided by the affine instruction at instruction offset 1 as a base, and further specifies a stride parameter value of "+1," a count parameter value of "M," and a loop level parameter of "0" (indicating that this affine instruction is the innermost affine instruction of the cascaded affine instructions). The output stream generated by this affine instruction is then sent as a left operand to the broadcast channel 1 (as indicated by the consumer instruction identifier "b[1, 1]").

The next two instructions are load byte instructions ("lb") instructions that receive the output stream from the affine instruction via the broadcast channel 1, as indicated by left operands "b1." The load byte instruction at instruction offset 3 retrieves a value stored at a location indicated by the base address of array a ("#(&a)") plus the offset indicated by the output values retrieved from the broadcast channel 1. Similarly, the load byte instruction at instruction offset 4 retrieves a value stored at a location indicated by the base address of array b ("#(&b)") plus the offset indicated by the output values retrieved from the broadcast channel 1. The load byte instruction at instruction offset 3 and the load byte instruction at instruction offset 4 then provide the retrieved values to the instruction at instruction offset 5 as the left operand and the right operand, respectively (as indicated by the consumer instruction identifiers "[5, 1]" and "[5, r]").

The instruction at instruction offset 5 is an add instruction ("add"), which receives the retrieved values from the load byte instructions at instruction offsets 3 and 4 as implicit left and right operands. The add instruction sums the retrieved values, and provides them to the instruction at instruction offset 6 as a right operand (as indicated by the consumer instruction identifier "[6, r]"). The instruction at instruction offset 6 is a store byte instruction ("sb") that receives the output stream from the affine instruction via the broadcast channel 1 (as indicated by the left operand "b1"), and also receives the summed value from the add instruction as an implicit right operand. The store byte instruction then stores the received summed value at a location indicated by the base address of array c ("#(&c)") plus the offset indicated by the output value retrieved from the broadcast channel 1.

According to some aspects, the decoder circuit 104 of the vector-processor-based device 100 of FIG. 1 may further provide an affine instruction that allows a stride value to be specified for operands. In such aspects, the affine instruction would enable support for address patterns of the following form, using an array a:

$$a[A*I+B*j]$$

The affine instruction according to such aspects could be useful for some matrix operations, such as matrix multiplication, in which the order of access varies across vectors.

Figure 5:
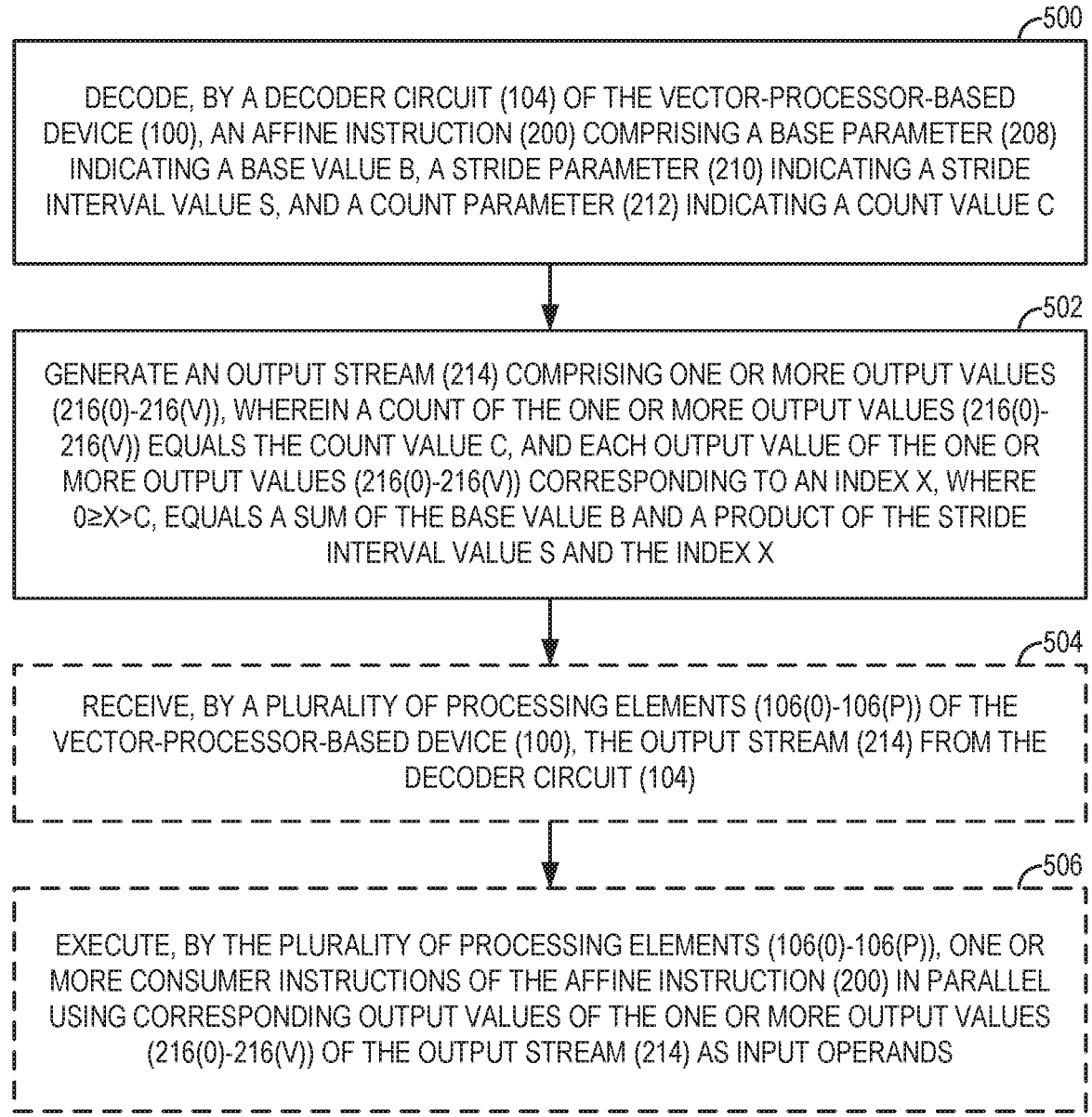
FIG. 5 is a flowchart illustrating exemplary operations performed by the vector-processor-based device of FIG. 1 for enabling parallel memory accesses using the affine instruction.

To illustrate exemplary operations for enabling parallel memory accesses by providing explicit affine instructions in the vector-processor-based device 100 of FIG. 1, FIG. 5 is provided. For the sake of clarity, elements of FIGS. 1 and 2 are referenced in describing FIG. 5. Operations in FIG. 5 begin with the decoder circuit 104 decoding an affine instruction 200 comprising a base parameter 208 indicating a base value B, a stride parameter 210 indicating a stride interval value S, and a count parameter 212 indicating a count value C (block 500). In this regard, the decoder circuit 104 may be referred to herein as "a means for decoding an affine instruction comprising a base parameter indicating a base value B, a stride parameter indicating a stride interval value S, and a count parameter indicating a count value C." The decoder circuit 104 then generates an output stream 214 comprising one or more output values 216(0)-216(V), wherein a count of the one or more output values 216(0)-216(V) equals the count value C, and each output value of the one or more output values 216(0)-216(V) corresponding to an index X, where 0≤X<C, equals a sum of the base value B and a product of the stride interval value S and the index X (block 502). Accordingly, the decoder circuit 104 may be referred to herein as "a means for generating an output stream comprising one or more output values, wherein a count of the one or more output values equals the count value C, and each output value of the one or more output values corresponding to an index X, where 0≤X<C, equals a sum of the base value B and a product of the stride interval value S and the index X."

In some aspects, the plurality of PEs 106(0)-106(P) of the vector-processor-based device 100 may receive the output stream 214 from the decoder circuit 104 (block 504). The plurality of PEs 106(0)-106(P) then execute one or more consumer instructions of the affine instruction 200 in parallel using corresponding output values of the one or more output values 216(0)-216(V) of the output stream 214 as input operands (block 506).

Enabling parallel memory accesses by providing explicit affine instructions in vector-processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
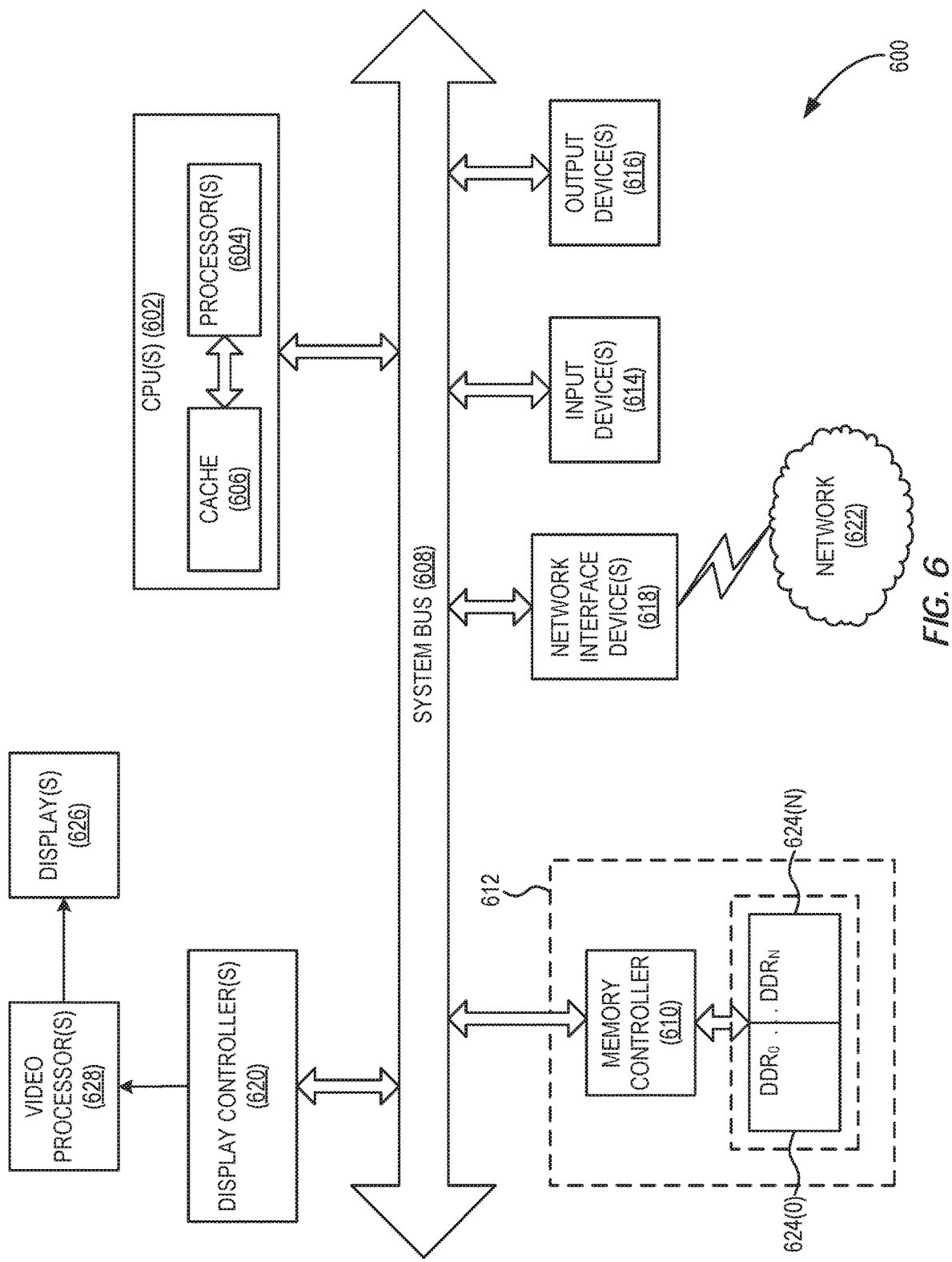
FIG. 6 is a block diagram of an exemplary processor-based system that can include the vector-processor-based device of FIG. 1.

In this regard, FIG. 6 illustrates an example of a processor-based system 600 that may correspond to the vector-processor-based device 100 of FIG. 1. The processor-based system 600 includes one or more central processing units (CPUs) 602, each including one or more processors 604 (which in some aspects may correspond to the PEs 106(0)-106(P) of FIG. 1). The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector-processor-based device implementing a block-based dataflow instruction set architecture (ISA) for enabling parallel memory accesses, wherein:
   the vector-processor-based device is configured to provide an affine instruction comprising:
      a base parameter indicating a base value B;
      a stride parameter indicating a stride interval value S; and
      a count parameter indicating a count value C; and
   the vector-processor-based device comprises a decoder circuit configured to:
      decode the affine instruction; and
      generate an output stream comprising one or more output values, wherein:
         a count of the one or more output values equals the count value C; and
         each output value of the one or more output values corresponding to an index X, where $0 \leq X < C$, equals a sum of the base value B and a product of the stride interval value S and the index X.

2. The vector-processor-based device of claim 1, wherein the affine instruction further comprises a loop level parameter indicating a nested level of the affine instruction relative to one or more other affine instructions.

3. The vector-processor-based device of claim 2, wherein:
   the affine instruction comprises a consumer affine instruction; and
   the one or more other affine instructions comprise a producer affine instruction that targets the consumer affine instruction and that has a loop level parameter having a nested level that is one (1) greater than a nested level of a loop level parameter of the consumer affine instruction.

4. The vector-processor-based device of claim 1, further comprising a plurality of processing elements configured to:
   receive, from the decoder circuit, the output stream; and
   execute one or more consumer instructions of the affine instruction in parallel using corresponding output values of the one or more output values of the output stream as input operands.

5. The vector-processor-based device of claim 4, wherein the affine instruction designates the one or more consumer instructions as targets of the output stream by the affine instruction.

6. The vector-processor-based device of claim 4, wherein the affine instruction designates a broadcast channel as a target of the output stream.

7. The vector-processor-based device of claim 1 integrated into an integrated circuit (IC).

8. The vector-processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A vector-processor-based device implementing a block-based dataflow instruction set architecture (ISA) for enabling parallel memory accesses, the vector-processor-based device comprising:
   a means for decoding an affine instruction comprising:
      a base parameter indicating a base value B;
      a stride parameter indicating a stride interval value S; and
      a count parameter indicating a count value C; and
   a means for generating an output stream comprising one or more output values, wherein:
      a count of the one or more output values equals the count value C; and
      each output value of the one or more output values corresponding to an index X, where $0 \leq X < C$, equals a sum of the base value B and the product of the stride interval value S and the index X.

10. A method for enabling parallel memory accesses in vectorizable loops by a vector-processor-based device implementing a block-based dataflow instruction set architecture, the method comprising:
    decoding, by a decoder circuit of the vector-processor-based device, an affine instruction comprising:
       a base parameter indicating a base value B;
       a stride parameter indicating a stride interval value S; and
       a count parameter indicating a count value C; and
    generating an output stream comprising one or more output values, wherein:
       a count of the one or more output values equals the count value C; and
       each output value of the one or more output values corresponding to an index X, where $0 \leq X < C$, equals a sum of the base value B and a product of the stride interval value S and the index X.

11. The method of claim 10, wherein the affine instruction further comprises a loop level parameter indicating a nested level of the affine instruction relative to one or more other affine instructions.

12. The method claim 11, wherein:
    the affine instruction comprises a consumer affine instruction; and
    the one or more other affine instructions comprise a producer affine instruction that targets the consumer affine instruction and that has a loop level parameter having a nested level that is one (1) greater than a nested level of a loop level parameter of the consumer affine instruction.

13. The method of claim 10, further comprising:
    receiving, by a plurality of processing elements of the vector-processor-based device, the output stream from the decoder circuit; and executing, by the plurality of processing elements, one or more consumer instructions of the affine instruction in parallel using corresponding output values of the one or more output values of the output stream as input operands.

14. The method of claim 13, wherein the affine instruction designates the one or more consumer instructions as targets of the output stream by the affine instruction.

15. The method of claim 13, wherein the affine instruction designates a broadcast channel as a target of the output stream.

16. A non-transitory computer-readable medium, having stored thereon computer-executable instructions for causing a vector processor of a vector-processor-based device to:
    decode an affine instruction comprising:
        a base parameter indicating a base value B;
        a stride parameter indicating a stride interval value S; and
        a count parameter indicating a count value C; and
    generate an output stream comprising one or more output values, wherein:
        a count of the one or more output values equals the count value C; and
        each output value of the one or more output values corresponding to an index X, where $0 \leq X < C$, equals a sum of the base value B and a product of the stride interval value S and the index X.

17. The non-transitory computer-readable medium of claim 16, wherein the affine instruction further comprises a loop level parameter indicating a nested level of the affine instruction relative to one or more other affine instructions.

18. The non-transitory computer-readable medium of claim 17, wherein:
    the affine instruction comprises a consumer affine instruction; and
    the one or more other affine instructions comprise a producer affine instruction that targets the consumer affine instruction and that has a loop level parameter having a nested level that is one (1) greater than a nested level of a loop level parameter of the consumer affine instruction.

19. The non-transitory computer-readable medium of claim 16 having stored thereon computer-executable instructions for further causing the vector processor to:
    receive, by a plurality of processing elements, the output stream from a decoder circuit; and
    execute one or more consumer instructions of the affine instruction in parallel using corresponding output values of the one or more output values of the output stream as input operands.

20. The non-transitory computer-readable medium of claim 19, wherein the affine instruction designates the one or more consumer instructions as targets of the output stream by the affine instruction.

21. The non-transitory computer-readable medium of claim 19, wherein the affine instruction designates a broadcast channel as a target of the output stream.

\* \* \* \* \*